United States Patent [19]

Hughes, Jr.

[11] 4,105,314
[45] Aug. 8, 1978

[54] HAND CRANK GENERATOR-POWERED ROTARY SLIDE PROJECTOR

[76] Inventor: Alexander W. Hughes, Jr., 19 Wardell Circle, Oceanport, N.J. 07757

[21] Appl. No.: 760,294

[22] Filed: Jan. 18, 1977

[51] Int. Cl.² .................. G03B 21/20; G03B 23/10; H02K 7/10
[52] U.S. Cl. ............................ 353/85; 310/75 B; 353/110
[58] Field of Search ............... 353/110, 85; 310/75 B

[56] References Cited

U.S. PATENT DOCUMENTS

| 422,716 | 3/1890 | Calahan | 353/110 |
|---|---|---|---|
| 1,254,746 | 1/1918 | Troxell | 353/110 |
| 1,412,972 | 4/1922 | Schwarzmann | 310/75 B |
| 2,390,877 | 12/1945 | Fisher | 310/75 B |
| 2,445,651 | 7/1948 | Weavie | 353/110 |
| 2,916,964 | 12/1959 | Pawlsohn | 353/110 |

*Primary Examiner*—Steven L. Stephan
*Attorney, Agent, or Firm*—Hubbell, Cohen, Stiefel & Gross

[57] ABSTRACT

A hand crank generator-powered slide projector is provided in which the hand cranking both powers a projection lamp to illuminate a transparency and causes automatic film frame advance of the transparencies after a preset number of cranks to provide a stationery illuminated slide display. The generator comprises a stator coil capable of having a current induced therein and a magnetic rotor rotatable within the stator for producing a changing magnetic field across the stator coil due to such rotaton for inducing the current therein. The stator coil is electrically connected to the illumination source for providing induced current thereto for enabling illumination of a positioned transparency. The crank is mechanically connected to the rotor for enabling rotation thereof and gear means are drivingly connected to the rotor for enabling simultaneous rotation therewith in response to rotation of the rotor by the crank. The gear means has a finger means mounted thereon for simultaneous rotation therewith with the finger means being mounted on the gear in mechanical alignment with a rotary slide film advance means which comprises a pocket for movably receiving a transparency carrying disc therein having perforations for cooperation with the frame advance mechanism. The finger means engages the frame advance mechanism as the gear is rotated and subsequently disengages from the frame advance means at a predetermined point in the rotation of the gear whereby the frame advance is resiliently returned to the initial position until subsequent advance of the next frame upon reengagement by the finger means. A limiting abutment may be mounted in the frame advance mechanism for selecting between single and double frame advance during each successive cycle of rotation of the gear. A predetermined gear ratio with respect to the rotatable rotor is provided for enabling a predetermined number of rotations of the rotor before the finger means engages the frame advance mechanism to change the positioned transparency so as to enable the positioned transparency to be illuminated for a predetermined interval for projecting the image before the image is changed.

10 Claims, 11 Drawing Figures

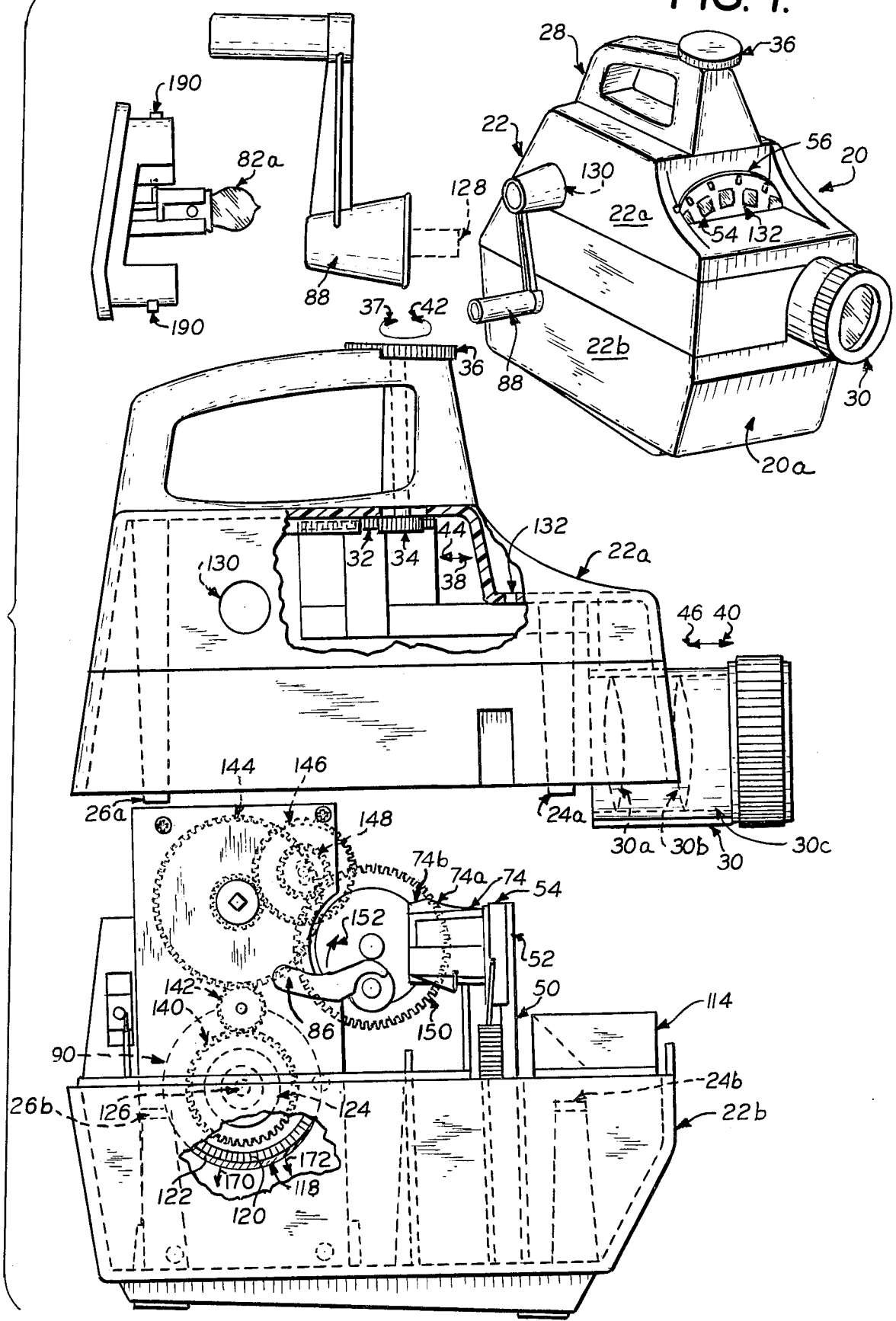

HAND CRANK GENERATOR-POWERED ROTARY SLIDE PROJECTOR

BACKGROUND OF THE INVENTION

1. Field of the Invention

The present invention relates to slide projectors such as for projecting rotary slides and particularly to improvements therein.

2. Description of the Prior Art

Slide projectors, and particularly such projectors for rotary slides are well known in the art. Examples of such prior art rotary slide projectors are disclosed in U.S. Pat. Nos. 2,916,964; 2,625,078; 2,701,981; 2,576,714; 2,571,584; 2,580,874; 2,241,041; 2,570,652; 1,645,204 and 3,874,788, the aforementioned patents being merely exemplary of the state of the art of rotary slide projectors and in no way exhaustive since this art is fairly well-developed, U.S. Pat. No. 1,645,204 enumerated above having issued in 1927, by way of example. Such rotary slide projectors have also been incorporated in toys, such as disclosed in U.S. Pat. No. 3,026,640, by way of example. In addition, such prior art rotary slide projectors have also provided for automatic frame advance such as disclosed in U.S. Pat. No. 2,679,705, by way of example, or as is readily available on conventional rotary slide projectors such as the type manufactured by Sawyer, Inc. In addition, the use of rotating crank driven slides to provide a moving type picture, such as for a lantern projector, is also well known as disclosed in U.S. Pat. Nos. 960,519 and 2,445,651, by way of example, or British Pat. No. 1,143, by way of example. Such prior art slide projectors have also enabled selection between different types of film frame advance such as single space film frame advance and double space film frame advance, such as disclosed in U.S. Pat. No. 2,916,964 referred to above. All of these prior art slide projectors, known to the inventor, however, require either a separate battery or AC source of power. Although other sources of power, such as hand generators have generally been well known, such as disclosed in the hand crank generator-powered flashlight sold under the trademark FLASHBRITE by Janex Corp. or such as disclosed in U.S. Pat. Nos. 2,393,813; 1,333,119; 1,015,298; 2,277,897; 1,411,615; 2,437,675; 1,131,063 and 2,535,041, by way of example, no such generators have been employed in slide projectors either separately or in conjunction with film frame advance. These disadvantages of the prior art are overcome by the present invention.

SUMMARY OF THE INVENTION

An improved slide projector for providing a changeable stationery illuminated slide display is provided which comprises a hand crank generator-powered rotary slide projector in which the hand cranking both powers a projection lamp and causes automatic film frame advance after a preset number of cranks to provide the changeable stationery illuminated slide display. The projector has a housing. A frame is mounted in the housing with the frame having means therein defining an upwardly open pocket for removably receiving a transparency carrying disc therein having perforations for cooperation with feeding means and having evenly spaced circumferentially arranged transparencies mounted therein. A feeding lever is pivotally mounted in the frame for partial rotation about an axis coincident with the center of the disc and having means thereon for successively engaging the perforations in the disc to bring the transparencies mounted in the disc to a desired position. The housing further comprises a source of illumination mounted therein for enabling illumination of the transparency when it is in the desired position and a lens means for projecting an image of the illuminated positioned transparency. The aforementioned frame is interposed between the illumination source and the lens means. Means are provided on the frame defining a track extending in a plane parallel to the plane of the received disc. The feeding lever further comprises a slide which comprises a portion engaged in the track whereby the slide is guided for sliding movement from end to end of the track. The slide further comprises an engageable portion projecting from the frame whereby the slide may be depressed towards the lower end of the track. Spring means are provided for returning the slide feeding lever to the upper end of the track when the slide is engaged and depressed and subsequently released. The movement of the slide is translated into rotary movement of the lever to thereby rotate the disc to a different desired position thereby interposing a different one of the transparencies in the desired position between the illumination source and the lens means for projecting the different transparency.

The hand crank operated generator means mounted within the housing comprises a stator coil means capable of having a current induced therein and a magnetic rotor means rotatable within the stator coil for producing a changing magnetic field across the stator coil due to such rotation for inducing the current therein. The stator coil is electrically connected to the illumination source for providing the induced current to the illumination source for enabling the illumination of the positioned transparency. Crank means are mechanically connected to the rotor for enabling the rotation thereof and gear means are drivingly connected to the rotor for enabling simultaneous rotation therewith in response to rotation of the rotor by the crank. The aforementioned gear means has a finger means mounted thereon for simultaneous rotation therewith. The finger means bearing gear means is mounted in the housing with the finger means being in mechanical alignment with the slide means engageable portion for depressing the slide upon engagement therewith as the gear means is rotated. The slide means engageable portion has means thereon for enabling the finger means to disengage from the slide means during rotation of the gear means as the slide means approaches the lower end of the track whereby the spring means may then return the slide to the upper end for subsequent reengagement by the finger means upon completion of a cycle of rotation of the gear means for changing the positioned transparency. The rotation of the crank thus both provides current to illuminate the positioned transparency as well as enabling the positioned transparency to be changed to a different one of the transparencies contained in the received disc.

A predetermined gear ratio with respect to the rotatable rotor is provided for enabling a predetermined number of rotations of the rotor, such as 12:1, before the finger means engages the slide means engageable portion to change the positioned transparency whereby the positioned transparency may be illuminated for a predetermined interval for projecting the image before being changed. The rotor preferably comprises a shaft for enabling rotation thereof and a magnet mounted about the shaft and rotatable therewith. The shaft preferably comprises means for mechanically removably coupling the crank means to the shaft on either side thereof whereby the generator means may be either a left-handed or right-handed crank generator dependent on the coupling side of the crank means to the shaft. Rack and pinion gear means are also provided for enabling focusing of the lens means with the rack means being connected to the lens means for linearly moving the lens means inwardly and outwardly and with the pinion gear means being rotatably mounted to the housing and in driving gear relation to the rack means for translating rotatable movement of the pinion gear means into linear movement of the rack means. The direction of such linear movement of the lens is dependent on the direction of rotation of the pinion gear whereby the projected image may be focused.

The aforementioned track in the frame preferably comprises an arcuate track concentric with the center of the received disc with the finger means enabling translation of rotary movement of the gear to rotary movement of the received disc. A limiting abutment is also preferably slidably mounted in the frame and selectably movable to and from a position at which it engages the perforation engaging means for limiting the movement thereof. The limiting abutment is preferably selectively movable between a position in which the adjacent transparencies are each successively positioned to the desired position during each successive cycle of rotation of the gear means and a position in which every other one of the adjacent transparencies are each successively positioned to the desired position during each successive cycle of rotation of the gear means. Thus, the amount of automatic film frame advance which occurs in the hand crank generator powered rotary slide projector, in which the hand cranking both powers the projection lamp and causes such automatic film frame advance after a preset number of cranks, may be selectively changed.

BRIEF DESCRIPTION OF THE DRAWINGS

FIG. 1 is a perspective view of the preferred embodiment of the slide projector of the present invention with a rotary slide illustratively removably positioned therein;

FIG. 2 is an exploded side elevational view of the projector of FIG. 1, partially in cut away section;

DETAILED DESCRIPTION OF THE PREFERRED EMBODIMENTS

Figure 3:
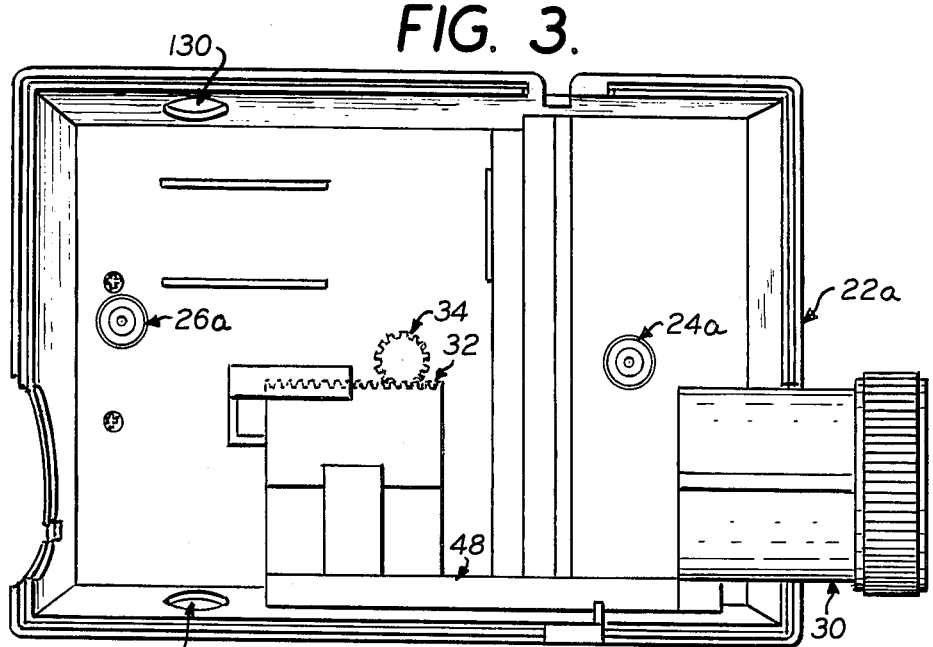
FIG. 3 is a bottom plan interior view of the top portion of the slide projector of FIG. 1.
Figure 4:
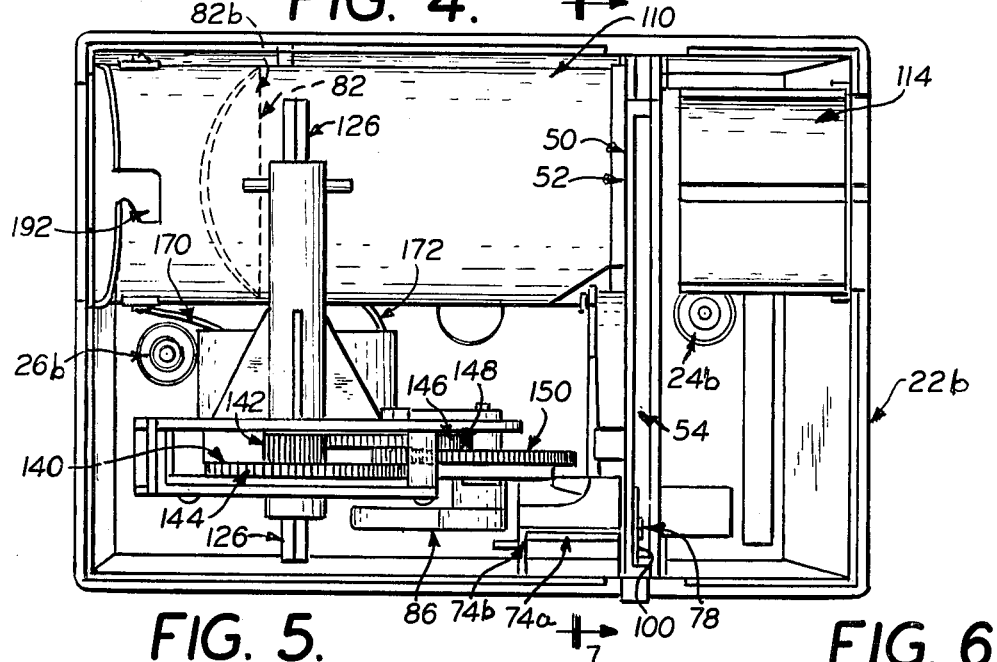
FIG. 4 is a top plan interior view of the bottom portion of the slide projector of FIG. 1.

Referring now to the drawings in detail and initially to FIGS. 1 and 2 thereof, the preferred embodiment of the hand crank generator-powered rotary slide projector of the present invention, generally referred to by the reference numeral 20, is shown. The slide projector 20 preferably comprises an outer casing or housing 22 having an upper portion 22a and a lower portion 22b which is mateable with the upper portion 22a and preferably secured thereto such as by conventional threaded screws (not shown) threadably joining mounting posts 24a and 26a contained in upper portion 22a with mounting posts 24b and 26b contained in lower portion 22b (FIGS. 3 and 4) and in which mounting posts 24a and 26a, respectively, nest. Of course, if desired, any other conventional means for securing the two portions 22a and 22b of the housing 22 together may be utilized without departing from the spirit and scope of the present invention. As also shown and preferred in FIG. 1, the housing 22 includes a handle portion 28 which, as will be explained in greater detail hereinafter, serves to both facilitate transporting the slide projector 20, which is preferably portable, as well as for holding it in position during operation thereof. The housing 22 may preferably be made of any conventional plastic, such as commonly used in the manufacture of toys, so as to facilitate its portability and lightweight as well as for economy.

As will be described in greater detail hereinafter, slide projector 20 also preferably includes a conventional projection lens 30 which is linearly movable inwardly and outwardly with respect to the front 20a of housing 20 by a rack 32 and pinion gear 34 arrangement in order to focus the image projected through lens 30. The pinion gear 34 is directly connected to a rotatable knob 36 preferably located outside the housing 20 to facilitate focusing of lens 30. Preferably, clockwise rotation of knob 36 in the direction of arrowhead 37 will cause clockwise rotation of pinion gear and subsequent linear advance of rack 30 in the direction of arrowhead 38 to linearly advance lens 30 out of the housing 20 in the direction of arrowhead 40, while counterclockwise rotation of knob 36 in the direction of arrowhead 42 will cause counterclockwise rotation of pinion gear 34 with subsequent linear movement of rack 32 in the direction of arrowhead 44 and corresponding linear movement or retraction of projection lens 30 into housing 40 in the direction of arrowhead 46. Projection lens 30 is a conventional projection lens arrangement such as one comprising a pair of lenses 30a and 30b mounted in a focusing tube 30c. As shown in more detail in FIG. 3, the rack 32 preferably has an extension portion 48 directly connected to projection lens 30 which is slidably mounted within the interior of upper housing portion 22a in conventional fashion for enabling the previously described linear translation inwardly and outwardly of the housing 22.

Slide projector 20 also preferably contains a conventional type of rotary slide frame advance mechanism 50, such as the type disclosed in U.S. Pat. No. 2,916,964, having certain improvements therein to be described in greater detail hereinafter. The frame advance mechanism 50 described in U.S. Pat. No. 2,916,964 converts linear movement to rotary movement for effecting frame advance of the rotary slide whereas, as will be described in greater detail hereinafter, the frame advance mechanism 50 of the present invention preferably converts rotary movement effected by the hand cranking, which both powers the projection lamp and enables automatic frame advance after a preset number of cranks, to subsequent rotary movement to effect such frame advance. The frame advance mechanism 50 preferably comprises a frame 52 having an upwardly open pocket 54 therein for removably receiving a transparency carrying disc or rotary slide 56. The rotary slide 56 is preferably of the conventional type, such as described in U.S. Pat. No. 2,916,964 and comprises a concentric series of evenly spaced transparencies 58 and a concentric series of feeding apertures 60, such as either being spaced between each adjacent pair of transparencies 58 or, as in the instance of the type of rotary slides 56 manufactured by GAF, Corp. and sold under the trademark Viewmaster, the apertures 60 may be spaced between every other pair of transparencies 58 with the Viewmaster type disc or rotary slide 56 mounting stereo-pairs of transparencies. In the illustration shown in FIG. 7, the transparencies 58 are preferably not stereo-pairs, but rather a different scene is preferably contained in each of the transparencies 58 mounted in the disc 56.

Figure 7:
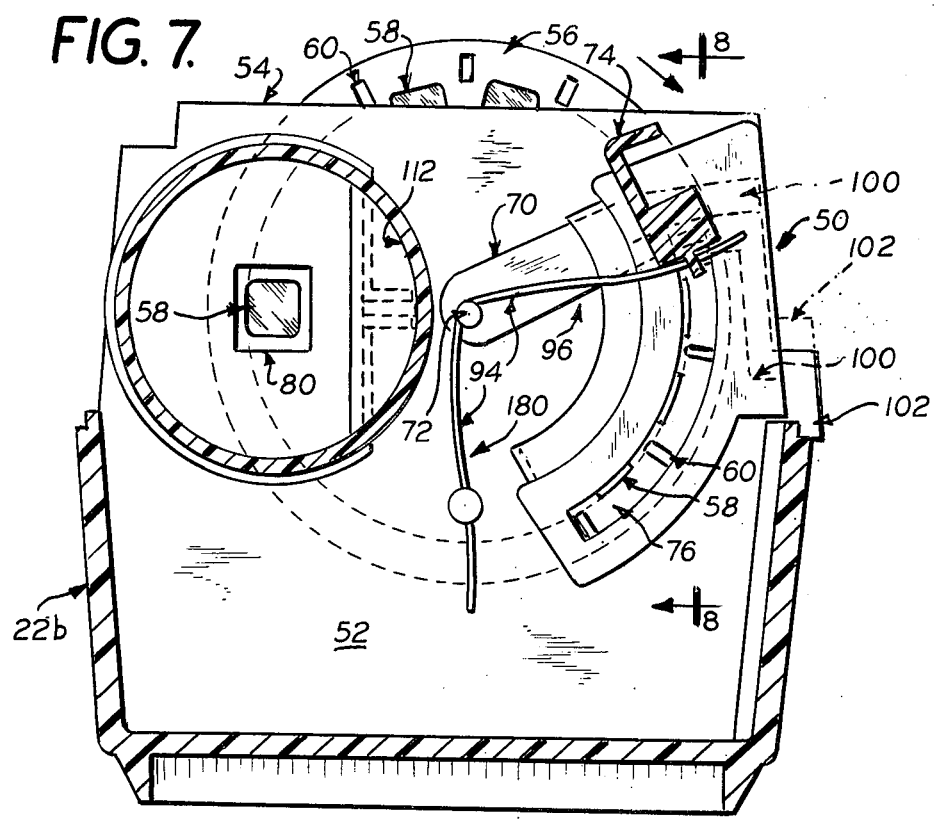
FIG. 7 is a sectional view taken along line 7—7 of FIG. 4.

As shown and preferred in FIG. 7, the frame advance mechanism 50 preferably includes a feeding lever 70 pivotally mounted in the frame 52 for partial rotation about an axis 72 coincident with the center of the received disc 56. The feeding lever 70 preferably includes a slide portion 74 at one end thereof which is slidably movable in an arcuate track 76, with track 76 also preferably being concentric with the center 72 of the received disc 56. The slide 74 as shown and preferred in FIGS. 8 through 11, preferably includes a protrusion 78 for successively engaging the perforations 60 in the disc 56 to successively bring the transparencies 58 mounted in the disc 56 to a desired position. With respect to the aforementioned desired position, the frame 52 of the frame advance mechanism 50 preferably comprises a frame gate or window 80 extending through the frame 52 so as to enable light to pass through a transparency 58a positioned in the desired position. The frame gate 80 is preferably arranged in housing 22 so as to be in optical alignment with projection lens 30 and with the projection lamp 82, which is to be described in greater detail hereinafter. The slide portion 74 also preferably includes an upwardly sloping ramp portion 74a and a downwardly sloping ramp portion 74b which slopes downwardly from the peak of upwardly sloped ramp portion 74a. As will be described in greater detail hereinafter, the purpose of ramp portions 74a and 74b are to enable subsequent engagement and disengagement of a rotating finger 86 as the hand crank 88 is turned to drive a generator 90 for powering the projection lamp 82. In addition to the upward and downward sloping of ramps 74a and 74b, respectively, these ramps 74a and 74b are also preferably sloped inwardly and downwardly toward the center 72. The frame advance mechanism 50 also preferably includes a conventional wire spring 94 for resiliently mounting the feeding lever 70 to the frame 52, with spring 94 preferably biasing lever arm 70 in the direction of arrow 96 so as to normally urge the feeding lever 70, slide 74 and protrusion 78 toward the upper end of the track 76 as illustrated in FIG. 7.

Figures 8, 9, 10, 11:
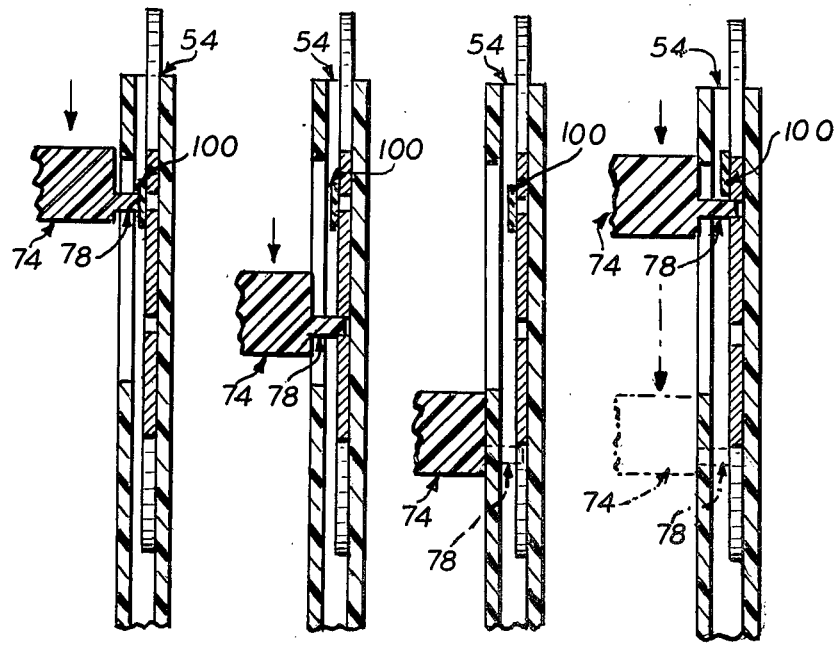
FIG. 8 is a fragmentary sectional view taken along line 8—8 of FIG. 7 illustrating the frame advance mechanism in position for single space frame advance at the start of said advance.
FIG. 9 is a view similar to FIG. 8 illustrating the film frame advance mechanism at a position just prior to the completion of said single space frame advance.
FIG. 10 is a view similar to FIG. 8 illustrating the frame advance mechanism at the completion of said single space frame advance.
FIG. 11 is a view similar to FIG. 8 illustrating said frame advance mechanism in position for double space frame advance.

As also shown and preferred in FIGS. 7 through 11, the frame advance mechanism 50 includes a limiting abutment means 100. This limiting abutment means 100, as shown and preferred in FIGS. 8 through 11, preferably determines the length of the arcuate path of travel of feeding lever 70 and hence protrusion 78 in arucate track 76, and is preferably selectively movable between two positions by means of a slidably mounted button 102 extending outside of the housing 22. The limiting abutment means 100 extends across arcuate track 76 to block the upward movement of protrusion 78 in track 76, which movement is caused by spring 94. As will be described in greater detail hereinafter, this limiting abutment 100 is preferably selectively movable between a position in which the adjacent transparencies 58 are each successviely positioned in the desired position in frame gate 80 during each successive cycle of rotation of the finger 86, referred to as single space frame advance, and a position in which every other one of the adjacent transparencies 58 are each successively positioned in the desired position in gate 80 during each successive cycle of rotation of the finger 86, referred to as double frame advance. The latter position is preferred when the rotary slide or disc 56 contains stereo pairs of transparencies. FIGS. 8 through 10 illustrate the limiting abutment 100 in the lower position illustrated in FIG. 7 wherein a single space frame advance occurs for each cycle of rotation of finger 86 and FIG. 11 illustrates limiting abutment 100 in the upper position illustrated in dotted lines in FIG. 7 wherein a double space frame advance occurs for each cycle of rotation of finger 86. Thus, as shown in FIGS. 8 through 10, in the lower position of limiting abutment 100, the protrusion 78 will be able to engage a perforation 60 in disc 56 such that the path of travel of protrusion 78 in arcuate track 76 will rotate disc 56 a distance corresponding to the position of one transparency 58 whereas, as illustrated in FIG. 11, in the upper position of limiting abutment 100, protrusion 78 will engage a perforation 60 such that the path of travel of protrusion 78 in arcuate track 76 will rotate disc 56 a distance corresponding to the position of two transparencies 58. Thus, as stated above, in the example illustrated in FIGS. 8 through 10 each successive adjacent transparency 58 will be positioned in frame gate 80 whereas, in the example illustrated in FIG. 11 every other one of the adjacent transparencies 58 will be positioned in frame gate 80.

The projection lamp 82 is preferably contained in a projection lamp tube housing 110 which is a hollow cylindrical housing forming a light passage therein. The projection lamp 82 preferably comprises a conventional flashlight bulb 82a which is inserted within a conventional reflector 82b therefor. The projection bulb 82a is preferably removably retained in the end of housing 110 by means of a conventional slotted interconnection 190–192. The opposite end of the projection lamp housing 110 preferably mates within a receptacle 112 contained on the surface of frame 52 of frame advance mechanism 50 so as to optically align the projection lamp 82 with the frame gate 80 and form a substantially light-tight path thereto in order to enable illumination of the positioned transparency 58a and subsequent projection of an image therefrom through focused projection lens 30. With respect to this projection lens 30 which was previously described, the lower portion 22b of the housing 22 preferably contains a semicircular sleeve portion 114 in which the bottom of the projection lens 30 may slidably move during focusing thereof.

As was previously mentioned, the slide projector 20 also preferably contains a generator 90 mounted within housing 22. The generator 90 preferably includes an outer housing or shell 118 in which is mounted a stator coil 120 wound about a circular core 122, and a concentrically mounted rotatable magnet 124 forming the rotor portion of the generator 90 which is mounted for rotation within stator coil 120. The magnet 124 is preferably mounted to a shaft 126 for simultaneous rotation therewith as the crank 88 is turned. The crank 88 is preferably conventionally removably mountable on either end of shaft 126 within a keyway 128 formed within a mounting portion of crank 88. By providing extensions of the shaft 126 on opposite ends thereof, the generator 90 may be either a left-handed crank generator or a right-handed crank generator dependent on the coupling side of the crank 88 to the shaft 126. The housing 22 preferably contains apertures 130 therein for enabling coupling access to the ends of shaft 126 for the mounting portion of crank 88. In addition, the upper portion 22a of housing 22 contains a slot 132 therein in alignment with and coextensive with pocket 54 in frame advance mechanism 50 for enabling insertion of the rotary slide or disc 56 through the housing 22 into pocket 54 as illustrated in FIG. 1. The rotor 124 is also preferably mounted to a conventional gear 140 which is in turn connected through conventional gearing arrangement 142, 144, 146 and 148 to a gear 150 upon which finger 86 is mounted for simultaneous clockwise rotation therewith in the direction of arrow 152. Preferably, the gear ratio of gears 140 through 150, inclusive, is selected so as to be at least substantially 12:1 for enabling at least 12 rotations of the rotor 124 for each cycle of rotation of gear 150, and hence each cycle of rotation of finger 86, so that 12 rotations of the rotor 124 will occur before the finger 86 engages slide 74 to change the positioned transparency 58a. This enables the positioned transparency 58a to be illuminated for a predetermined interval for projecting the image before being changed to a different transparency 58. Although the aforementioned gear ratio of 12:1 is presently preferred, any other desired gear ratio may be chosen dependent on the desired display interval for a given positioned transparency 58.

Figure 5:
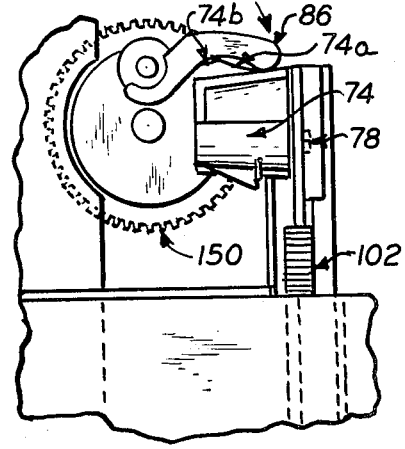
FIG. 5 is a fragmentary side elevational view of a portion of the slide changing mechanism illustrated in FIG. 2 showing the gear driven finger means at the start of engagement with the frame advance mechanism.
Figure 6:
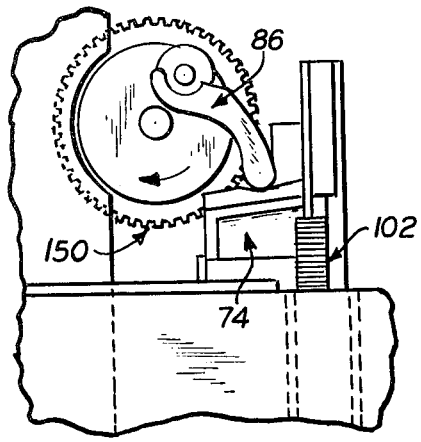
FIG. 6 is a fragmentary side elevational view similar to FIG. 5 showing the gear driven finger means at completion of the down stroke of the frame advance mechanism just prior to disengagement of the finger means from the frame advance mechanism.

Now describing the operation of the slide projector 20 of the present invention. The crank 88 is mounted on shaft 126. A rotary slide or disc 56 which has been inserted through slot 132 in housing 22 into pocket 54 and is received therein is now ready for projection thereof. The user then grasps the handle 28 firmly so as to prevent movement of the projector 20 and rotates crank 88 in a clockwise direction. The rotation of crank 88, turns shaft 126 which in turn rotates rotor 124 changing the magnetic field through stator coil 122, thereby inducing a current in stator coil 122. Since stator coil 122 is electrically connected via wires 170 and 172 to bulb 82a, the bulb 82a is illuminated, the induced current being sufficient to illuminate bulb 82a. The projection lamp 82 thereby illuminates transparency 58a positioned in gate 80 to thereby project an image of the transparency 58a through projection lens 30 onto a screen or other display surface. As the user continues to crank the hand generator 90, the positioned transparency 58a continues to be illuminated to provide a conventional type of stationary slide display, and gear 140 continues to rotate which, through its driving gear connection 142-144-146-148 to gear 150 causes gear 150 to continue to rotate thereby rotating finger 86 in the direction of arrow 152. As finger 86 rotates around it reaches the position illustrated in FIG. 5 where it contacts slide 74 essentially at the base of ramp portion 74a. As the crank 88 thereafter continues to turn generating power to illuminate lamp 82a, the finger 86 continues to rotate thereby depressing slide 74 in the direction of arrow 180, which is opposite to the direction of arrow 96, overcoming the biasing force of spring 94. The protrusion 78 thereafter engages a perforation 60 in rotating disc 56 to either advance the rotary slide or disc 56 by a single frame or a double frame, depending on the position of the limiting abutment 100, as a result of the movement of slide 74 from the upper end of arcuate track 76 to the lower end of arcuate track 76, such movement being illustrated in FIG. 6. As the shaft 126 continues to rotate as a result of the continued rotation of crank 88, the aforementioned gear drive continues to rotate gear 150 thereby rotating finger 86 which then rides up to the top of ramp 74a and down ramp 74b so as to disengage from slide 74. This disengagement enables spring 94 to resiliently return the slide to the upper end of arcuate track 76 ready for subsequent reengagement by finger 86 during the next cycle of rotation. As previously mentioned, this cycle of rotation of finger 86 is equivalent to the cycle of rotation of gear 150 which is preferably arranged to be in a 12:1 gear ratio with shaft 126. The aforementioned cycle continues to repeat as long as the user continues to turn crank 88 to rotate shaft 126. Thus, the hand cranking by turning of crank 88 both powers the projection lamp 82a to enable illumination of the positioned transparency 58a and causes automatic frame advance of the rotary slide or disc 56 after the preset number of cranks, such as the aforementioned 12 cranks, to provide the changeable stationary illuminated slide display.

What is claimed is:

1. In a projector having a housing, a frame mounted in said housing, said frame having means therein defining an upwardly open pocket for removably receiving a transparency carrying disc therein having perforations for cooperation with feeding means and having evenly spaced circumferentially arranged transparencies mounted therein, a feeding lever pivotally mounted in said frame for partial rotation about an axis coincident with the center of the disc and having means thereon for successively engaging the perforations in said disc to bring the transparencies mounted in said disc to a desired position, said housing further comprising a source of illumination mounted therein for enabling illumination of said transparency when it is in said desired position and a lens means for projecting an image of said illuminated positioned transparency, said frame being interposed between said illumination source and said lens means, said projector further comprising means on said frame defining a track extending in a plane parallel to the plane of the received disc, said feeding lever comprising a slide, said slide comprising a portion engaged in said track whereby said slide is guided for sliding movement from end to end of said track, said slide further comprising an engageable portion projecting from said frame whereby said slide may be depressed toward the lower end of said track, spring means for returning the slide to the upper end of said track when said slide is engaged and depressed and subsequently released, and means interconnecting said lever and said slide for translating movement of said slide into rotary movement of said lever to thereby rotate said disc to a different desired position for interposing a different one of said transparencies in said desired position between said illumination source and said lens means for projecting said different transparency; the improvement comprising hand crank operated generator means mounted in said housing, said generator means comprising a stator coil means capable of having a current induced therein and a magnetic rotor means rotatable within said stator coil means for producing a changing magnetic field across said stator coil means due to said rotation for inducing said current therein, said stator coil means being electrically connected to said illumination source for providing said induced current to said illumination source for enabling said illumination of said positioned transparency, crank means mechanically connected to said rotor means for enabling said rotation thereof, and gear means drivingly connected to said rotor means for enabling simultaneous rotation therewith in response to rotation of said rotor means by said crank means, said gear means having a finger means mounted thereon for simultaneous rotation therewith, said finger means bearing gear means being mounted in said housing with said finger means being in mechanical alignment with said slide means engageable portion for depressing said slide upon engagement therewith as said gear means is rotated, said slide means engageable portion having means thereon for enabling said finger means to disengage from said slide means during rotation of said gear means as said slide means approaches the lower end of said track whereby said spring means may return said slide to said upper end for subsequent reengagement by said finger means upon completion of a cycle of rotation of said gear means for changing said positioned transparency, said rotation of said crank means both providing current to illuminate said positioned transparency as well as changing said positioned transparency to a different one of said transparencies.

2. An improved slide projector in accordance with claim 1 wherein said gear means comprises means for providing a predetermined gear ratio with respect to said rotatable rotor means for enabling a predetermined number of rotations of said rotor means before said finger means engages said slide means engageable portion to change said positioned transparency, whereby said positioned transparency may be illuminated for a predetermined interval for projecting said image before being changed.

3. An improved slide projector in accordance with claim 2 wherein said gear ratio is at least substantially 12:1 for enabling at least substantially 12 rotations of said rotor means before said finger means engages said slide means engageable portion to change said positioned transparency.

4. An improved slide projector in accordance with claim 1 wherein said rotor means comprises a shaft for enabling rotation thereof and a magnet mounted about said shaft and rotatable therewith, said shaft comprising means for mechanically removably coupling said crank means to said shaft on either side thereof whereby said generator means may be either a left-handed or right-handed cranked generator means dependent on the coupling side of said crank means to said shaft.

5. An improved slide projector in accordance with claim 1 further comprising means for enabling focusing of said lens means, said focusing means comprising a rack and pinion gear means with said rack means being connected to said lens means for linearly moving said lens means inwardly and outwardly and with said pinion gear means being rotatably mounted to said housing and drivingly geared to said rack for translating rotatable movement of said pinion gear means into linear movement of said rack means, the direction of said linear movement of said lens means being dependent on the direction of rotation of said pinion gear means, whereby said projected image may be focused.

6. An improved slide projector in accordance with claim 1 wherein said track comprises an arcuate track concentric with the center of said received disc, said finger means enabling translation of rotary movement of said gear means to rotary movement of said received disc.

7. An improved slide projector in accordance with claim 6 further comprising a limiting abutment means slidably mounted in said frame and selectively movable to and from a position at which it engages said perforation engaging means for limiting the movement thereof.

8. An improved slide projector in accordance with claim 7 wherein said limiting abutment means is selectively movable between a position in which said adjacent transparencies are each successively positioned in said desired position during each successive cycle of rotation of said gear means and a position in which every other one of said adjacent transparencies are each successively positioned in said desired position during each successive cycle of rotation of said gear means.

9. An improved slide projector in accordance with claim 1 further comprising a limiting abutment means slidably mounted in said frame and selectively movable to and from a position at which it engages said perforation engaging means for limiting the movement thereof.

10. An improved slide projector in accordance with claim 9 wherein said limiting abutment means is selectively movable between a position in which said adjacent transparencies are each successively positioned in said desired position during each successive cycle of rotation of said gear means and a position in which every other one of said adjacent transparencies are each successively positioned in said desired position during each successive cycle of rotation of said gear means.

* * * * *